United States Patent [19]
Ruschke et al.

[11] Patent Number: 5,195,840
[45] Date of Patent: Mar. 23, 1993

[54] TORQUE TRANSMISSION SHAFT ASSEMBLY

[75] Inventors: Gary S. Ruschke, Edison; Richard S. Smarz, Bayonne, both of N.J.

[73] Assignee: Curtiss Wright Flight Systems, Inc., Fairfield, N.J.

[21] Appl. No.: 805,849

[22] Filed: Dec. 10, 1991

[51] Int. Cl.$^5$ .............................................. F16D 1/10
[52] U.S. Cl. ................................... 403/359; 403/305; 403/287; 403/229; 464/182; 464/901
[58] Field of Search ............... 403/359, 305, 301, 287, 403/361, 229; 464/182, 901, 161–169; 281/337, 323, 322

[56] References Cited

U.S. PATENT DOCUMENTS

| | | | |
|---|---|---|---|
| 2,468,182 | 4/1946 | Dempsey | 464/169 |
| 2,567,127 | 9/1981 | Shoffner | 464/169 |
| 2,598,780 | 6/1952 | Garnier | 464/147 |
| 3,069,875 | 12/1962 | Crum, Jr. | 464/901 X |
| 3,171,269 | 3/1965 | Gilmore et al. | 464/169 |
| 3,367,138 | 2/1968 | Tiedeman | 464/901 X |
| 3,367,140 | 2/1968 | Stillwagon | 464/169 |
| 3,604,737 | 9/1971 | Tarpey | 403/193 |
| 4,270,367 | 6/1981 | Santore | 464/169 |
| 4,560,300 | 12/1985 | Vollmer et al. | 403/11 |
| 4,895,470 | 1/1990 | Scherzinger | 403/359 X |
| 4,991,992 | 2/1991 | Gutfleisch | 464/162 X |

FOREIGN PATENT DOCUMENTS 1216414 4/1960 France .................................. 464/169

Primary Examiner—Randolph A. Reese
Assistant Examiner—Harry C. Kim
Attorney, Agent, or Firm—Klauber & Jackson

[57] ABSTRACT

A torque transmission shaft assembly for connecting a drive shaft and driven shaft which are mutually spaced less than the length of the assembly. The assembly includes a rigid elongated hollow rod member having a body portion and first and second open end portions. Each end portion is adapted to receive either the drive or driven shafts, and is provided with internal involute splines for mating with corresponding external splines on the shafts to be connected by the assembly. The first end portion has an axially displaceable stop member and a biasing spring compressible by displacement of the stop member away from the open first end, for biasing the stop member against the shaft received in the first end portion. The second end portion has a rigid stop at the end of its internal splines, for abutting against the end of the shaft receivable therein. By virtue of such construction, one of the shafts to be connected may be received into the first end portion of the assembly where it abuts against the displaceable stop member and compresses same while the other shaft is received into the second end portion. The compression of the biasing spring is thereupon relaxed to complete the connection of the shafts.

6 Claims, 2 Drawing Sheets

TORQUE TRANSMISSION SHAFT ASSEMBLY

BACKGROUND OF THE INVENTION

The present invention relates generally to the field of couplings and more particularly to torque transmission shaft couplings for connecting a drive means to a driven means, without the use of mechanical fasteners, in a severe vibrational environment such as on an aircraft. Vibration transmitted to the coupling by either the drive or driven mating components could result in the coupling becoming disengaged or failing.

In mechanical power transmission systems used on aircraft there is also a need for a torque transmitting coupling which is effectively of one piece design and is of low weight, inexpensive and of high reliability. Furthermore, it is desirable to utilize a torque transmitting coupling of the telescoping type which is used on aircraft and which has a hard stop on the spring end thereof after its installation. Additionally it is desirable to utilize a torque transmitting coupling of the telescoping type which does not require the use of mechanical fasteners or locking mechanisms to lock the coupling in its telescoped position or to anchor, it to its mating components.

A principal object of the invention is to provide a new and improved torque transmission shaft assembly for use on an aircraft. More specifically, it is an object of the invention to provide a torque transmission shaft assembly which after installation is permitted to float freely between its stops without disengagement, between the drive means and the driven means thereby eliminating transmissibility of vibration between it and its mating components.

Another object of the present invention is to provide a torque transmission shaft assembly which is effectively of one piece design, which has low weight and high reliability, and which is inexpensive to manufacture.

Still another object of the present invention is to provide a torque transmission shaft assembly of the telescoping type which does not require the use of means to lock the shaft assembly in its telescoped position or to connect it to its mating components.

SUMMARY OF THE INVENTION

Now in accordance with the present invention, the foregoing objects, and others as will become apparent in the course of the ensuing specification, are achieved in a torque transmission shaft assembly for connecting a drive shaft and driven shaft which are mutually spaced less than the length of the assembly. The assembly includes a rigid elongated hollow rod member having a body portion and first and second open end portions. Each end portion is adapted to receive either the drive or driven shafts, and is provided with internal involute splines for mating with corresponding external splines on the shafts to be connected by the assembly. The first end portion has an axially displaceable stop member and spring biasing means, compressible by displacement of the stop means away from the open first end, for biasing the stop means against the shaft received in the first end portion. The second end portion has a rigid stop at the end of its internal splines, for abutting against the end of the shaft receivable therein. By virtue of such construction, one of the shafts to be connected may be received into the first end portion of the assembly where it abuts against the displaceable stop member ad compresses same until the other shaft is able to be received into the second end portion. The compression of the spring biasing means is thereupon relaxed to complete the connection of the shafts.

The first end portion of the assembly may include a transverse shoulder formed within the end portion and axially spaced from the opening thereof. A spring having an axially displaceable end and a base end is coaxially disposed within the first end portion with its base end resting on the transverse shoulder. A plunger means having a head portion and a stem portion, is axially disposed within this end portion for compressing the spring means. The stem portion is axially received within the coil of the spring and the displaceable end of the spring engages the head portion to urge the plunger means axially outward. The spring and plunger means thereby define the axially displaceable stop means.

The first end portion of the assembly may include a first sleeve which is coaxially disposed within and affixed to the body portion of the rod member, and within which the plunger means is axially movable. The sleeve is open at one end and has an inwardly directed shoulder at its opposite end which defines the transverse shoulder for the spring base. The inwardly directed shoulder surrounds a central opening through which the stem portion of the plunger means is axially moveable. Such stem has a transverse stop pin on its portion projecting through the opening, for limiting the spring-biased movement of the plunger means toward the open end of said first end portion, thereby maintaining the spring in a minimum preload condition. The spring constant is such that the preload at the displaceable stop member exceeds any force resulting from the weight and inertia of the assembly and the abutting drive or driven shaft during operation.

The assembly second end portion may comprise a second sleeve which is open at one end and coaxially disposed within and affixed to the body portion of the rod member, the sleeve having a transverse wall inwardly of the open end which defines the rigid stop means when either the drive or driven shaft is inserted into the second end portion and engages the transverse wall.

The assembly first and second end portions, and the body portion of the rod member can be separate members, with the first and second end portions being rigidly affixed to the body portion. The body portion, and first and second portions of the assembly are preferably joined by magneforming, although other well-known joining methods may also be used.

Other objects and advantages will become apparent from the following description taken in connection with the accompanying drawings.

DETAILED DESCRIPTION OF THE PREFERRED EMBODIMENT

Figure 1:
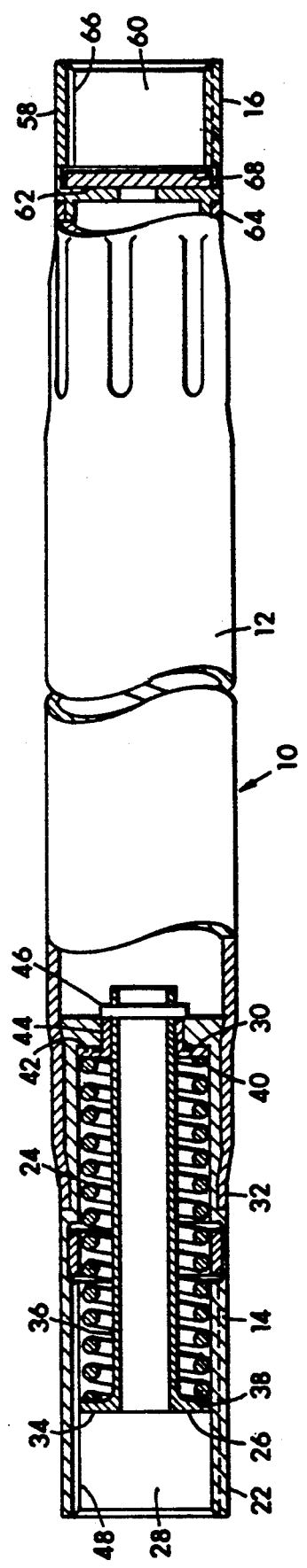
FIG. 1 is an axial view partly in elevation and partly in cross-section of a preferred embodiment of the improved torque transmission shaft assembly.

Referring now to the drawings, a preferred embodiment of the torque transmission shaft assembly 1 for connecting a drive shaft and a driven shaft is shown comprising a rigid elongated hollow rod member 10 of cylindrical shape manufactured from a metallic or composite material and having a body portion 12 and first and second open end portions, 14 and 16, respectively, the latter portions being rigidly affixed to the body portion. These open end portions 14 and 16 are adapted to be connected to either a drive or a driven shaft 18 and 20, respectively (FIG. 2). End portions 14 and 16 carry involute splines respectively at 48 and 66, which enable mating with complementary external splines on the shafts to be connected by the assembly. The first end portion 14 of the rod member 10 comprises a first cylindrical-shaped sleeve 22, a spring means 24 in the form of a compression spring coaxially disposed within said sleeve 22, and a plunger means 26 axially disposed within said spring means 24. The sleeve 22 is open at one end 28 and has an inwardly formed shoulder 30 at its opposite end. Sleeve 22 is coaxially disposed within and affixed to a first end 32 of said body portion 12, preferably by a magneforming operation.

The plunger means 26 has a head and stem portions, 34 and 36, respectively, and the spring 24 has a displaceable outer end 38 and an inner or base end 40, respectively, the displaceable outer end 38 of the spring engaging the inner face of the head portion 34 and the base end 40 of the spring 24 being disposed in abutting engagement against the shoulder 30 of the first sleeve 22 through the flange of a small sleeve 42, the body portion of which extends through the opening 44 which is surrounded by shoulder 30 of the sleeve 22. The spring 24 biases the plunger means 26 axially outwards, until a pin 46 extending transversely through the end of the stem portion 36 of the plunger 26 limits its outward travel, to thereby assure that the spring is maintained in a minimum preload condition. This in turn assures that the head portion 34 of the plunger 26 defines a stop means when in its position corresponding to minimum preload for spring 24.

The first sleeve 22 has internal splines 48 longitudinally extending inward a substantial distance along its length from its open end 28. Both drive and driven shafts 18 and 20, respectively, are in the form of a male part having externally splined ends 50 and 52, respectively, and end faces 54 and 56, respectively, which when either end face 54 or 56 is disposed in direct or abutting engagement with the outer end face of the head portion 34 of the plunger 26, and compress the spring 24 and axially moves them and when axially moved inwardly a predetermined amount, the spring and plunger together operate as a retractable stop against which the travel of the end faces 54 and 56 of the two shafts 18 and 20 are limited.

The second end portion 16 of the rod member 10 comprises a second cylindrical sleeve 58 which is open at one end 60 and closed at its opposite end 62 and coaxially disposed within and affixed to a second end 64 of said body portion 12. The second sleeve 58 has a transverse wall portion against which is fitted a disc-shaped member 68. Sleeve 58 also has internal splines 66 longitudinally extending inwardly along its length from its open end 60 to adjacent disc 68. Disc-shaped member 68 defines a hard stop when either end face 54 or 56 of drive or driven shafts 18 and 20, respectively, is disposed in direct or abutting engagement with the outer end face of the disc-shaped member 68, thereby limiting the inward travel of said end faces 54 and 56.

Figure 2A:
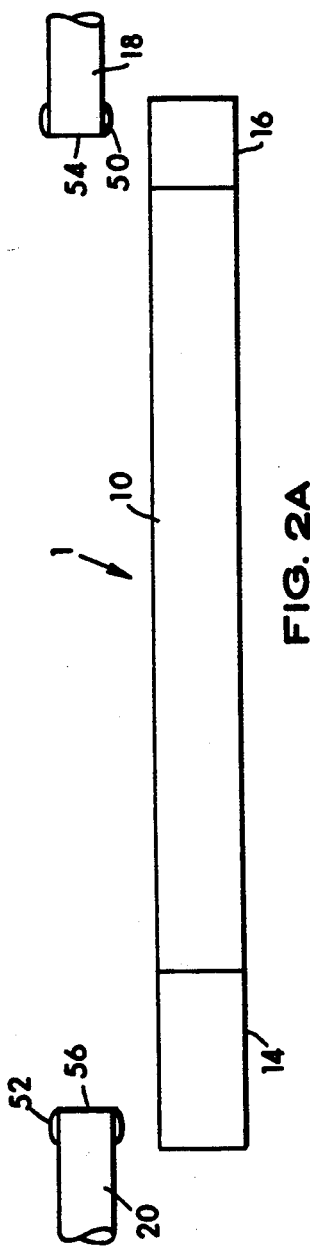
FIGS. 2A, 2B and 2C are axial elevation views of the improved torque transmission shaft assembly shown in FIG. 1 and the ends of a drive and driven shaft which are shown in various stages of installation with the torque transmission shaft assembly.
Figure 2B:
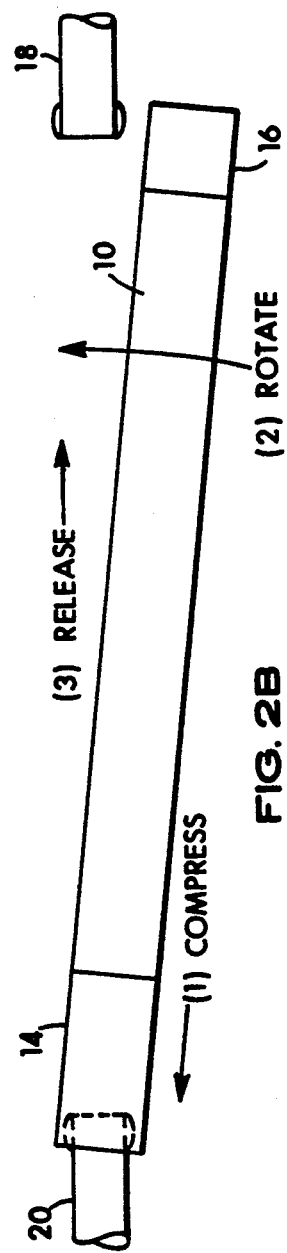
Figure 2C:
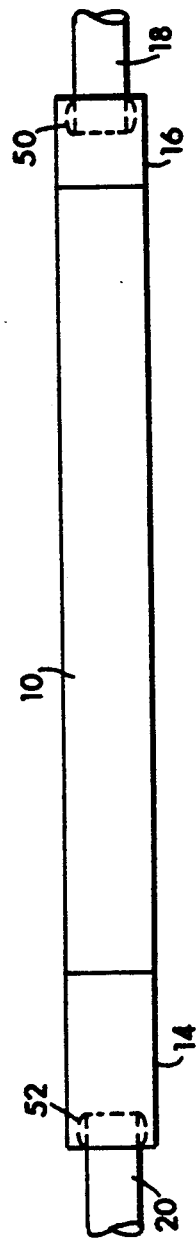

Installation of the torque transmission shaft assembly 1 between and to the drive shaft 18 and driven shaft 20 is schematically shown in FIGS. 2A, 2B and 2C. FIG. 2A shows the assembly and shafts 18 and 20 which are to be connected. Installation is achieved by sliding the first end portion 14, the spring/plunger end of the rod member 10 onto the coupling 52 of the driven shaft 20. This action is carried out while a slight angle is maintained between the axis of assembly 10 and the axis of shaft 20. The shafts to be connected are provided with crowned external involute splines at 50 and 52 to enable this operation. (The external splines need not be crowned if shafts 18 and 20 are supplied with a different means of achieving the desired rotation, such as U-joints or flex couplings.) The rod member 10 is then pushed against the driven shaft 20 to compress the spring 24 (FIG. 2B) as the assembly 10 is rotated to align its axis with those of shafts 18 and 20. The rod member 10 is thus aligned with said drive shaft 18. Then the compression force on the spring/plunger end 14 is released allowing the second end portion 16 to engage the coupling 52 of the driven shaft 18. These steps are schematically shown a steps (1), (2) and (3) in FIGS. 2B and 2C.

The amount of preload on the spring 24 must be greater than any force resulting from the weight and inertia of the torque transmission shaft assembly 1. During operation the torque shaft 1 will have the freedom to axially slide between the retractable stop of the spring/plunger assembly in one end 14 of the rod member 10 and the fixed stop in the second end 16 of the rod member 10.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now apended hereto.

What is claimed is:

1. A torque transmission shaft assembly for connecting a drive shaft and driven shaft which are mutually spaced less than the length of the assembly, comprising:
   a rigid elongated hollow rod member having a body portion and first and second open end portions,
   each end portion being adapted to receive either said drive or driven shafts and being provided with internal involute splines for mating with complimentary external splines on the shafts to be connected by said assembly;
   said first end portion having an axially displaceable stop means and spring biasing means compressible by displacement of said stop means away from said open first end, for biasing said stop means against a said shaft received in said first end portion; and
   said second end portion having a rigid stop at the end of said internal splines, for abutting against the end of the said shaft receivable therein;
   whereby one of said shafts to be connected may be received into said first end portion to abut against said displaceable stop member and compress said spring biasing means while the other shaft is received into said second end portion, the compression of said spring biasing means being thereupon relaxes to complete the connection of the shafts, wherein said first end portion comprises:

a transverse shoulder formed within said end portion and axially spaced from the opening thereof;

a spring having an axially displaceable end and a base end, said spring being coaxially disposed within said first end portion with said base end resting on said transverse shoulder; and a plunger means having a head portion and a stem portion, being axially disposed within said end portion for compressing said spring means, said stem portion being axially received within the coil of said spring and said displaceable end of said spring engaging head portion to urge said plunger means axially outward; said plunger means thereby defining said axially displaceable stop means, wherein said first end portion further comprises a first sleeve which is coaxially disposed within and affixed to said body portion of said rod member, and within which said plunger means is axially moveable; said sleeve being open at one end and having an inwardly directed shoulder at its opposite end which defines said shoulder for said spring base, said assembly further including means for limiting the spring-biased movement of said plunger means toward the open end of said first end portion, thereby maintaining said spring in a minimum preload condition, wherein said inwardly directed shoulder surrounds a central opening through which said stem portion of said plunger means is axially moveable; said stem having a transverse stop pin on its portion projecting through said opening, for effecting the said limiting of the spring-biased movement of said plunger means toward the open end of said first end portion, thereby maintaining said spring in a minimum preload condition.

2. The assembly of claim 1, wherein said spring is assembled with a preload such that the said preload at said displaceable stop member exceeds any force resulting from the weight and inertia of the shaft itself and the abutting drive or driven shaft during operation.

3. The assembly of claim 1, wherein said second end portion comprises a second sleeve which is open at one end and coaxially disposed within and affixed to said body portion of said rod member, said sleeve having a transverse wall inwardly of said open end which defines said rigid stop means when either said drive or driven shaft is inserted into said second end portion and engages said transverse wall.

4. The assembly of claim 2, wherein said head portion of said plunger means forms a hard stop for the shaft received at said first end portion.

5. The assembly of claim 1, wherein said first and second end portions and said body portion of said rod member are separate members and wherein said first and second end portions are rigidly affixed to said body portion.

6. The assembly of claim 5, wherein said body, first, and second portions are joined by magneforming.

* * * * *